United States Patent [19]

Law

[11] 4,273,405
[45] Jun. 16, 1981

[54] JACKETED METAL CLAD CABLE CONNECTOR

[75] Inventor: Joseph P. Law, Scotch Plains, N.J.

[73] Assignee: Thomas & Betts Corporation, Raritan, N.J.

[21] Appl. No.: 65,762

[22] Filed: Aug. 13, 1979

[51] Int. Cl.³ .......................... H01R 4/66; H02B 1/12
[52] U.S. Cl. .............................. 339/94 R; 174/65 SS;
339/14 R; 339/177 R
[58] Field of Search .................. 339/14 R, 14 L, 177,
339/94, 143 R; 174/65 SS, 78, 51; 277/12, 165

[56] References Cited

U.S. PATENT DOCUMENTS

| | | | |
|---|---|---|---|
| 2,816,949 | 12/1957 | Curtiss | 339/14 L X |
| 2,941,025 | 6/1960 | Wayman | 174/65 SS |
| 2,986,409 | 5/1961 | Weber | 285/161 |
| 3,406,373 | 10/1968 | Forney | 339/94 C X |
| 3,448,430 | 6/1969 | Kelly | 339/143 |
| 3,485,517 | 12/1969 | Howe | 175/65 SS X |
| 3,567,843 | 3/1971 | Collins | 174/51 |
| 3,783,178 | 1/1974 | Philibert et al. | 339/14 R X |
| 4,022,966 | 5/1977 | Gajajiva | 339/14 R X |

Primary Examiner—Eugene F. Desmond
Attorney, Agent, or Firm—Robert M. Rodrick; Jesse Woldman

[57] ABSTRACT

A liquid-tight connector for joining a jacketed flexible metal clad cable to an electrical enclosure with a continuous ground path between the cladding and the enclosure. To a standard body-gland nut arrangement is added a sealing ring and a grounding ring effectively operated to grip the cable jacket and metal cladding respectively as the gland nut is tightened upon the body. Reduction of the sealing ring bore to cause the ring to grip the cable jacket is accomplished by an undercut in the ring wall and a dual outer diameter arrangement which deforms the sealing ring as its enlarged portion is forced into the body bore and as the ring is compressed between the gland nut and stops on the grounding ring. The sealing ring further operates the grounding ring whose upstanding arms are moved and deformed into intimate contact with the metal cladding of the cable. Supports on the arms assure proper displacement of the arms while stops insure proper compression of the sealing ring.

22 Claims, 14 Drawing Figures

JACKETED METAL CLAD CABLE CONNECTOR

BACKGROUND OF THE INVENTION

1. Field of the Invention

The invention relates to the field of coupling jacketed metal-clad cables to electrical enclosures while maintaining a continuous ground path between the metal cladding and the enclosure.

2. Description of the Prior Art

A common prior art connector employs a metallic grounding ring having a contact tooth intended to be inserted between the outer surface of the metal cladding and the inner surface of the cable jacket. The ring is split to permit it to accommodate a range of cable diameters and has a fringed end to insure contact between the ground ring and the connector body to provide a good electrical path therebetween. Today's improved cables employ tightly shrunk-on jackets over the cable armor or cladding making insertion of the contact tooth between the cladding and the jacket difficult, if not impossible. Also, such prior art connector must be totally disassembled permitting a loss of connector parts.

Because the contact tooth is difficult to install, it is often improperly installed or discarded entirely by the workman and thus there is no assurance that there is a continuity of ground path between the metal cladding and the electrical enclosure. The fully internal mounting of the ground ring makes it difficult to determine from the outside of the connector whether the ground ring has been improperly installed or discarded.

A second type of connector for jacketed metal clad cables employs a split overlapped ring brought into contact with the metal cladding by means of three set screws operated from outside of the metal body of the connector. The screw holes and the screws themselves offer leakage paths for moisture to enter the connector.

With both types of connectors liquid-tightness and strain relief for the cables is provided by means of a resilient sealing ring have a conically tapered leading surface forced into contact with a complementarily tapered bore within the connector body by the tightening of a gland nut upon the body. The degree of strain relief and liquid-tightness will depend upon how well the tapers match and how tightly the gland nut is applied to the body. Thus, if both types of connectors are tightly applied proper strain relief is applied to the cable and some liquid-tightness. However, the proper ground path can only be established by separate operations which may or may not be carried out properly or at all. In the former case, the contact tooth could be discarded and in the latter the set screws could be left in their loose condition.

SUMMARY OF THE INVENTION

The present invention overcomes all of the difficiencies noted above with respect to the prior art devices and which can be applied to a properly prepared jacketed metal clad cable as a single unit and have all of its functions operated by the mere tightening of the gland nut upon the connector body. Within the communicating bores of the gland nut and body are placed a grounding ring having deflectable arms to grip the metal cladding when acted upon by a sealing ring advanced by said gland nut tightening. The grounding ring further has stop legs engageable by said sealing ring to limit the advancement of the sealing ring in the body. The sealing ring has an undercut in the walls defining the central bore so that upon the application of compressive forces by the ground ring stop legs and the gland nut, the sealing ring deforms to grip the jacket of the cable passing therethrough. The sealing ring exterior is composed of two cylindrical portions of different diameters so that as the larger diameter portion is forced into the body bore the sealing ring further deforms to grip the cable jacket.

The relationship between the grounding ring and sealing ring is so established that if both elements are present, the grounding ring arms will be closed into intimate electrical engagement with the metal cladding of the cable and the sealing ring will be deformed to tightly grip the jacket of the cable providing a liquid tight seal about the cable and excellent strain relief. However, in the event the grounding ring has been installed incorrectly (i.e., backwards) or omitted entirely, the necessary spacing for compressing the sealing ring is not established and the sealing ring will be forced into the body bore without sufficient deformation to grip the cable and the low pull-out strength of the joint will immediately inform the workman or the inspector of the error in installation. It is therefore an object of this invention to provide an improved liquid-tight, strain relief connector with grounding for jacketed metal-clad cables.

It is an object of this invention to provide a connector for jacketed metal clad cables whose installation can be easily checked despite connector assembly.

It is another object of this invention to provide a connector for jacketed metal-clad cables having a grounding ring to control the deformation of a sealing ring to insure proper deformation of the sealing ring only in the presence of the grounding ring.

It is still another object of this invention to provide a sealing ring capable of deformation in two modes to provide a strain relief and moisture seal for a jacketed metal clad cable.

Other objects and features of the invention will be pointed out in the following description and claims and illustrated in the accompanying drawings, which disclose, by way of example, the principle of the invention, and the best mode which has been contemplated for carrying it out.

BRIEF DESCRIPTION OF THE DRAWINGS

In the drawings in which similar elements are given similar reference characters.

DESCRIPTION OF THE PREFERRED EMBODIMENTS

Figure 1:
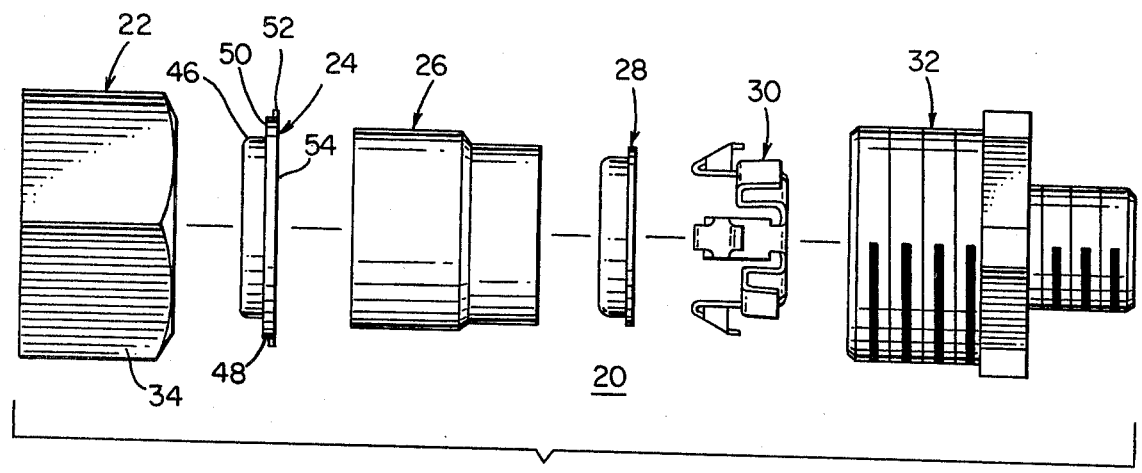
FIG. 1 is an exploded side elevational view of a connector for jacketed metal-clad cable constructed in accordance with the concepts of the invention.
Figure 2:
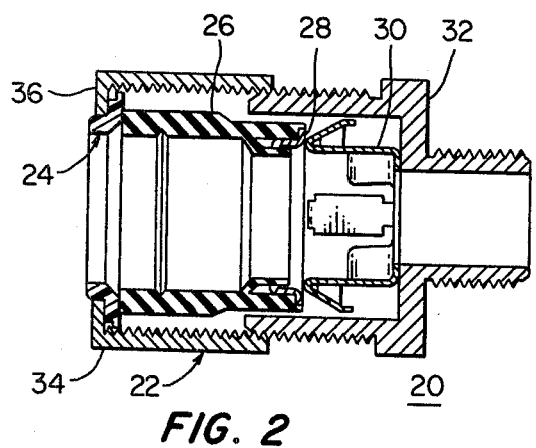
FIG. 2 is a side elevational view of the connector of FIG. 1 assembled.
Figures 3, 4:
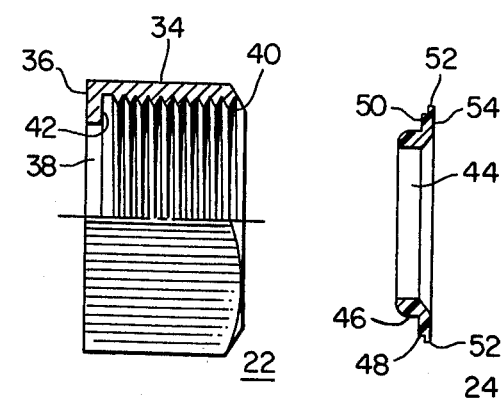
FIG. 3 is a side elevational view, partly in section, of the gland nut of the connector of FIG. 1.
FIG. 4 is a side elevational view, partly in section, of the retaining ring of the connector of FIG. 1.
Figure 5:
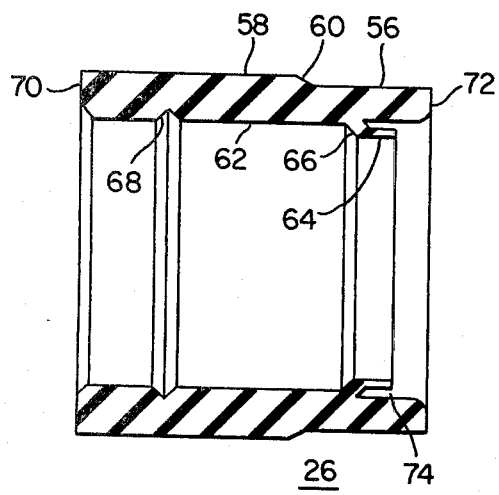
FIG. 5 is a side elevational view, partly in section, of the sealing ring of the connector of FIG. 1.
Figure 6:
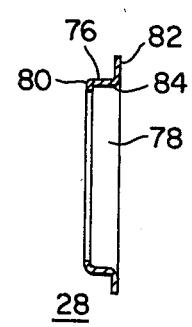
FIG. 6 is a side elevational view, partly in section, of the insert to the sealing ring of the connector of FIG. 1.

Turning now to FIGS. 1 to 10 and 14 there is shown a connector 20 instructed in accordance with the concepts of the invention. Connector 20 is composed of a gland nut 22, a retaining ring 24, a sealing ring 26, an insert 28, a grounding ring 30 and a body 32. Gland nut 22 has a series of wrench flats 34 about its outer periphery so that it can be tightened upon body 32 using a suitable tool. As seen in FIG. 3, gland nut 22 has a rear wall 36 through which extends a bore 38. The main portion of the gland nut 22 has an internally threaded bore 40 extending therethrough and communicating with bore 38. The juncture of the larger bore 40 with bore 38 forms shoulder 42.

A retaining ring 24 (see FIG. 4) has a central bore 44 therethrough of a diameter somewhat smaller than bore 38 through rear wall 36 of the gland nut 22. A stepped outer surface is composed of a first diameter portion 46 dimensioned to fit within the bore 38 of gland nut 22 and a second diameter portion 48 greater than portion 46 so that shoulder 50 abuts shoulder 42 of gland nut 22 and prevents the retaining ring 24 from passing through bore 38 of gland nut 22. Four tabs 52 around the periphery of second diameter portion 48 are dimensioned to seat themselves in the roots of the threads of threaded bore 40 of the gland nut 22 and prevent separation of the retaining ring 24 from the gland nut 22. The retaining ring 24 is fabricated from a low friction material such as TFE fluorocarbon or FEP fluorocarbon to provide a surface 54 to contact the back end of the sealing ring 26 and permit the gland nut 22 to turn easily despite the high frictional characteristics of the sealing ring 26.

Figure 14:
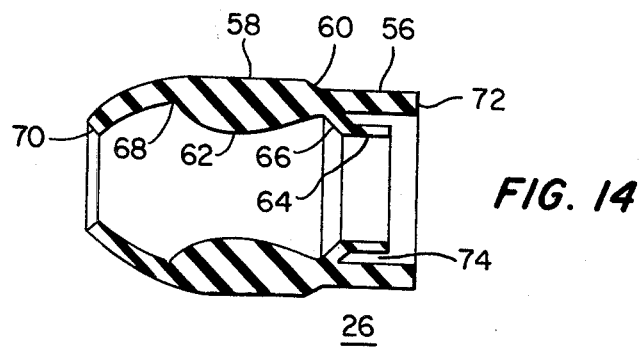
FIG. 14 is a side elevation, partly in section, of the sealing ring of FIG. 1 as it appears under full compression.

Sealing ring 26 (see FIG. 5) has a first cylindrical section 56 of a first diameter and a second cylindrical section 58 of a second diameter greater than the first, the juncture therebetween being a tapered transition portion 60. Within the sealing ring 26 is a main bore 62 of a first diameter and a secondary bore 64 of a second lesser diameter. The transition between the bores 62, 64 is tapered as at 66. An annular undercut 68 adjacent a first end 70 of the sealing ring 26 permits the sealing ring 26 to deform as shown in FIG. 14 and grip the jacket of a jacketed metal-clad cable passing through bore 62. The sealing ring 26 will be subjected to compression forces applied to its two ends 70, 72 respectively.

A metal insert 28 is inserted into a recess 74 adjacent the end 72 of the sealing ring 26. The insert 28 (see FIG. 6) has a circular body 76 with a passage 78 therethrough and is encircled by a small annular lip 80. Body 76 is encircled by a flange 82. Rounded edge 84 provides a smooth entry into the passage 78. The insert 28 is set into the recess 74 of the sealing ring 26 so that the body 76 extends along the length of the recess 74 with the annular lip 80 below the level of the secondary bore 64. In this manner the edge of a cable moving along bore 62 will be deflected by the tapered transition 66 to the secondary bore 64 and avoid engagement with the lip 80 of the insert 28 which could dislodge it from the sealing ring 26. The flange 82 will abut end 72 of the sealing ring 26 to limit insertion of the insert 28 into the sealing ring 26. The rounded edge 84 now provides a solid lead into the bore 64 of the sealing ring not available with the resilient material, such as rubber, plastic, etc., from which the sealing ring 26 is fabricated.

Figure 10:
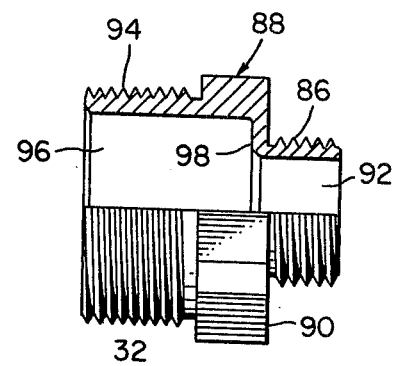
FIG. 10 is a side elevation, partly in section, of the body of the connector of FIG. 1.

The sealing ring 26 outer surfaces are intended to function with the bore of the body 32 of FIG. 10. Body 32 has a first externally threaded portion 86 intended to fit within the knock-out of the wall of an electrical enclosure and be coupled to such wall by a suitable lockout (not shown) applied thereto. The body 32 could also be coupled to a threaded hub attached to the enclosure wall. The wall (not shown) will be engaged between a locknut (not shown) and the flange 88 intermediate the body 32. Flange 88 has a series of wrench flats 90 thereabout to assist in anchoring the body 32 to the wall. A bore 92 extends through portion 86 to permit the individual conductors of the cable to enter the enclosure. A second externally threaded portion 94 is arranged to threadably receive the internally threaded bore 40 of gland nut 22 to unite the connector 20. A bore 96 extends through the second threaded portion 94 to receive the metal clad cable with the jacket removed. The shoulder 98 formed between the large diameter bore 96 and the smaller diameter bore 92 acts as a stop for the end of the metal cladding of the cable.

The outside diameter of the first cylindrical section 56 of the sealing ring 26 is just less than the inside diameter of bore 96 of the second externally threaded portion 94 and permitting the first cylindrical section 56 to enter bore 96 up to the tapered transition portion 60. However, under the application of forces by the gland nut 22 to the end 70 of the sealing ring 26 as the gland nut 22 is tightened upon the second threaded portion 94 of the body 32, the sealing ring 26 transition portion 60 and then the second cylindrical section 58 are forced into bore 96 of the second externally threaded portion of body 32 causing the sealing ring 26 to deform and the walls defining the bore 62 to firmly grip the jacket of the jacketed metal-clad cable providing strain relief and a liquid-tight joint.

Thus, the sealing ring 26 is subjected to two separate deformations to grip the jacket of a jacketed metal-clad cable: (1) the axial deformation of the walls about bore 62 due to the application of compressive forces applied to its two ends 70, 72 and (2) the radial deformation of the walls about bore 62 as a result of being forced into a sleeve of a diameter less than the outer diameter of the relaxed sealing ring 26.

Figure 7:
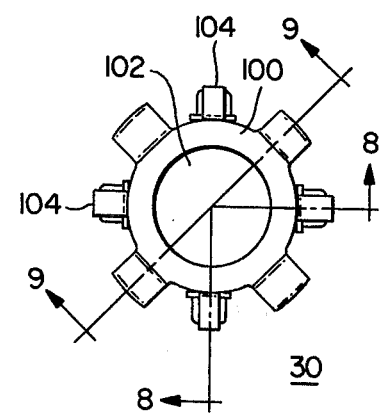
FIG. 7 is top plan view of the grounding ring of the connector of FIG. 1.
Figure 8:
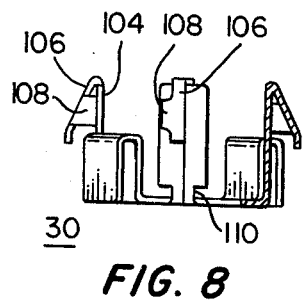
FIG. 8 is a side elevational view, partly in section, of the grounding ring of FIG. 7 taken along the lines 8—8 of FIG. 7.
Figure 9:
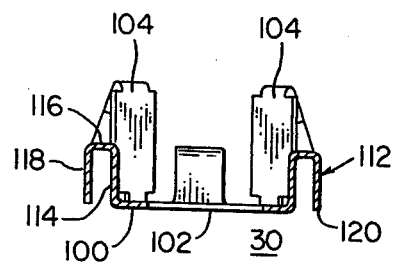
FIG. 9 is a side elevational view, partly in section, of the grounding ring of FIG. 7 taken along the lines 9—9 of FIG. 7.

FIGS. 7 to 9 show the grounding ring 30 details. Ring 30 has a generally circular base portion 100 with an aperture 102 therein through which passes the metal-clad cable with the jacket removed. Four upstanding deformable arms 104 extend along the longitudinal axis of the cable from the base 100 and terminate in outwardly inclined arms 106 which are arranged to engage the rounded edge 84 of insert 28 of sealing ring 26 and be deformed into intimate contact with the metal cladding of the cable. The jointure between the arms 104, 106 will enter the bore 64 to some degree as connector 20 is assembled. Supports 108 extend from the outwardly inclined arms 106 towards the upstanding arms 104 to prevent the outwardly inclined arms 106 from bending independently of the upstanding arms 104 and obtaining the desired deformation of the upstanding arms 104 with the resultant intimate contact with the metal cladding of the cable. The width of the upstanding arms 104 at their juncture with base 100 is reduced by notches 110 to better control the bending of the upstanding arms 104.

Intermediate the upstanding arms 104 are placed stop arms 112 comprised of a short upstanding portion 114, a stop surface 116 parallel with the plane of the base 100 and a descending portion 118 terminating in a flat end 120 in the plane of the bottom of base 100. Thus, the stop arms 112 are supported at the base 100 by portion 114 and by flat end 120 resting on shoulder 98 of body 32 outside of the silhouette of the base 100 of grounding ring 30 giving the stop arms 112 rigidity. The engagement of the descending portions 118 with the walls of second externally threaded portion 94 defining bore 96 hold the grounding ring 30 in the bore 96 of body 32.

The stop surface 116 is engaged by the edge 72 of sealing ring 26, and thus the sealing ring 26 is compressed as gland nut 22 is tightened upon body 32 with edge 70 of sealing ring 26 in contact with surface 54 of retaining ring 24 in the gland nut 22 and edge 72 on stop surface 116 of the grounding ring 30 anchored in bore 96 of body 32. In the event that grounding ring 30 was omitted proper compression pressure forces could not be applied to the sealing ring 26. Due to the length of the sealing ring 26 it would contact shoulder 98 in body 32 when the gland nut 22 was fully installed to the body 32 but the sealing ring 26 could not be placed under appropriate compression to close the sealing ring 26 about the cable. As a result the absence of the grounding ring 32 could be detected by the low pull-out forces required to remove the cable from connector 20. If the grounding ring 32 were inserted oppositely, then the base 100 would enter the bore 64 and the walls of the sealing ring 26 about bore 64 would attempt to enter the space between arms 114 and 118 but would not have a firm base to engage end 72 and place the sealing ring 76 in compression. Thus, the low pull-out forces to separate the connector 20 from the cable would indicate that the grounding ring 32 was improperly installed or omitted entirely.

Figure 11:
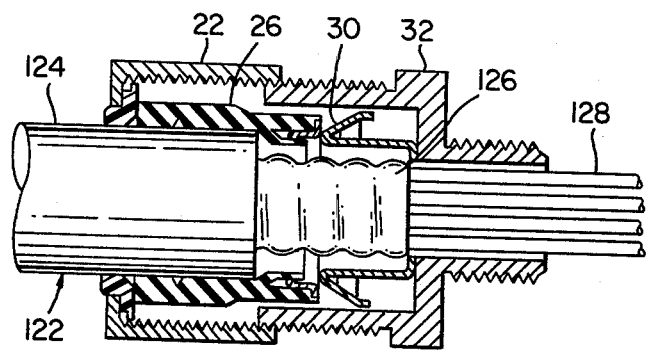
FIG. 11 is a side elevation, partly in section, of the assembled connector of FIG. 2 with a properly prepared jacketed metal-clad cable inserted therein.
Figure 12:
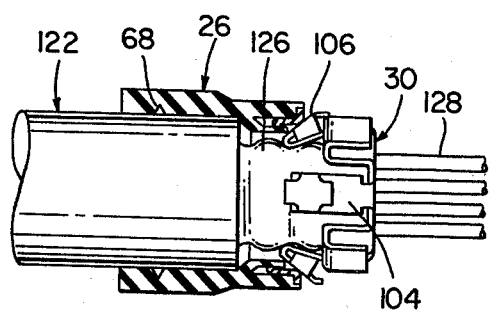
FIG. 12 is a side elevational view of the sealing ring and grounding ring of FIG. 11 only so that the details of their operation may be better appreciated. The positions are those taken by a partially assembled connector.
Figure 13:
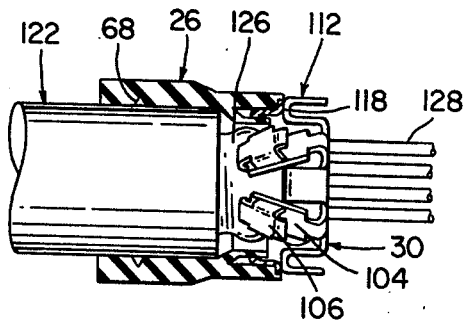
FIG. 13 is a side elevational view, partly in section, of the elements of FIG. 12 fully assembled.

Turning now to FIGS. 11 to 13 the installation of a connector 20 to a properly prepared cable 122 is shown. A portion of the jacket 124 is removed to expose the armor or cladding 126. The cladding or armor 126 is removed providing a square edge to the cladding to expose individual conductors 128. With the cable 122 thus prepared, the cable 122 is inserted into the connector 20, loosely assembled, through passage 44 in the retaining ring 24 in gland nut 22. The cable 122 is moved forward into the connector 20 until the square edge of the cladding 126 contacts shoulder 98 of body 32. The individual conductors 128 will pass through bore 92 into the enclosure while the jacket 124 will remain within the bore 62 of the sealing ring 26. The internally threaded bore 40 of the gland nut 22 will be tightened upon the second externally threaded portion 94 of the body 32 causing the sealing ring 26 to advance to the right of FIG. 12 due to the contact between edge 70 of the sealing ring 26 and the surface 54 of retaining ring 24. The engagement between rounded edge 84 of insert 28 of sealing ring 26 and the outwardly inclined arms 106 of grounding ring 30, cause the upstanding arms 104 to deflect inwardly into contact with the cladding 126 of the cable 122. The sealing ring 26 will continue to advance causing further deformation of the upstanding arms 104 into contact with cladding 126. At the same time the sealing ring 26 will radially distort as the larger outside diameter cylindrical portion 58 is forced into bore 96. This will provide some gripping of the jacket 124 of cable 122 and will provide the moisture seal for the cable 122. The sealing ring 26 will advance further into bore 96 of body 32 until the flange 82 of the insert 28 of sealing ring 26 strikes the stop surfaces 116 of stop arms 112 at which time further forward progress of the sealing ring 26 into bore 96 stops and further deformation of the upstanding arms 104 stops. The continued tightening of the gland nut 22 now places the sealing ring 26 in compression between surface 54 of the retaining ring 24 in the gland nut 22 and the stop surfaces 116 of the grounding ring 30 in bore 96 of the body 32. This compression produces a deformation along the longitudinal axis of the sealing ring 26 at the undercut 68 which is radially inwardly directed into contact with the jacket 124 of cable 122 providing an additional moisture seal, but most importantly a strong grip on the jacket to provide the necessary union and strain relief. The high pull-out forces required to remove connector 20 from cable 122 show immediately that grounding ring 30 is present and properly installed.

While there have been shown and described and pointed out the fundamental novel features of the invention as applied to the preferred embodiment, it will be understood that various omissions and substitutions and changes of the form and details of the device illustrated and in its operation may be made by those skilled in the art, without departing from the spirit of the invention.

The embodiments of the invention in which an exclusive property or privilege is claimed are defined as follows:

1. A grounding ring for metal-clad cables comprising: a base having a generally circular configuration and defining an aperture to receive a metal-clad cable therethrough; at least two upstanding arms coupled to said base, diametrically opposed and extending perpendicularly to the plane of said base along the extent of a portion of a metal-clad cable passing through said aperture in said base; outwardly inclined arms, one coupled to the free end of each of said upstanding arms adapted to be engaged by a member advanced towards said base to force said upstanding arms into intimate engagement with the metal cladding of a metal-clad cable passing therebetween; and stop means coupled to said base and extending in the direction of said upstanding arms to limit the advancement of a member towards said base.

2. A grounding ring as defined in claim 1, further comprising support means extending between said outwardly inclined arms and said upstanding arms to prevent the deflection of said inclined arms with respect to said upstanding arms.

3. A grounding ring as defined in claim 1, further comprising support means coupled to said outwardly inclined arms and extending to said upstanding arms to prevent the deflection of said inclined arms with respect to said upstanding arms.

4. A grounding ring as defined in claim 1, wherein said stop means comprises at least two short arms, alternately arranged along the periphery of said base with said upstanding arms.

5. A grounding ring as defined in claim 1, comprising four upstanding arms coupled to said base at 90° positions about the outer periphery thereof.

6. A grounding ring as defined in claim 5, further comprising support means coupled to said outwardly inclined arms and extending to said upstanding arms to prevent the deflection of said inclined arms with respect to said upstanding arms.

7. In a connector for connecting a jacketed metal-clad cable to an electrical enclosure and providing a ground path between said cladding and said enclosure comprising a body member having a first externally threaded portion for insertion within the knockout of an electrical enclosure, a second externally threaded portion for receipt thereon of an internally threaded gland nut and an annular ring therebetween to engage a first side of an enclosure about a knockout through which said first externally threaded portion has been inserted; said first externally threaded portion having a first bore of a first diameter; said second externally threaded portion having a second bore of a second diameter larger than said first bore, and communicating therewith; the juncture between said first and second bores forming a shoulder within said annular ring; an internally threaded gland nut to threadably engage the second externally threaded portion of said body member; said gland nut having an end wall with a bore therethrough; and a retaining ring positioned in said bore of said end wall of said gland nut; the improvement comprising: a grounding ring having a base in a generally circular configuration and defining an aperture to receive a metal-clad cable therethrough; at least two upstanding arms coupled to said base, diametrically opposed and extending perpendicularly to the plane of said base along the extent of a portion of a metal-clad cable passing through said aperture in said base; and outwardly inclined arms, one coupled to the free end of each of said upstanding arms; and a generally cylindrical sealing ring having a first end and a second end and a bore extending therethrough from said first end to said second end; said sealing ring second end engaging said retaining ring and said sealing ring first end engaging said outwardly inclined arms of said grounding ring; said outwardly inclined arms causing said upstanding arms to move into intimate engagement with the cladding of the metal-clad cable passing through the connector as the sealing ring is advanced upon the outwardly inclined arms of the grounding ring by the tightening of the gland nut upon the second externally threaded portion of the body member.

8. A connector as defined in claim 7 wherein said sealing ring has a first cylindrical outer surface having a first diameter approximately equal to the diameter of said second bore of said body member for insertion therein and a second cylindrical outer surface having a second diameter larger than the diameter of said second bore of said body member; said sealing ring outer surface having a tapered transition between said first cylindrical outer surface and said second cylindrical outer surface; the forces applied to said second end of said sealing ring as said gland nut is tightened upon said second externally threaded portion of said body member causing said sealing ring to advance into said second bore of said body member first along said first diameter of said sealing ring then along said tapered transition and finally along said second diameter of said sealing ring to compress said sealing ring about the jacket of a metal-clad cable passed through said connector.

9. A connector as defined in claim 7, wherein said grounding ring further comprises support means coupled to said outwardly inclined arms and extending to said upstanding arms to prevent the deflection of said inclined arms with respect to said upstanding arms.

10. A connector as defined in claim 7, wherein said sealing ring first end has a metallic insert therein to engage the inwardly inclined arms of said grounding ring.

11. A connector as defined in claim 10, wherein said metallic insert has a bore therethrough and the inlet thereto is tapered.

12. A connector as defined in claim 10, wherein said sealing ring has a tapered shoulder in said bore adjacent the interior end of said metallic insert to prevent contact between the end of said metal-clad cable and said insert as said cable is passed through said connector.

13. A connector as defined in claim 7, wherein said sealing ring has an undercut in the wall defining said bore perpendicular to the longitudinal axis of said bore to permit said sealing ring to deform to grip the jacket about said metal-clad cable as said gland nut is tightened upon the second externally threaded portion of said body member.

14. A connector as defined in claim 13, wherein said grounding ring further comprises stop means coupled to said base and extending in the direction of said upstanding arms to limit the advancement of said sealing ring into the second bore of said body member and assure proper deformation of said sealing ring into gripping engagement with the jacket of said metal-clad cable.

15. A sealing ring comprising a resilient cylindrical sleeve having a first end and a second end; said sleeve having a first bore extending from said first end towards said second end; an annular undercut in the wall of the sleeve defining said bore adjacent said first end; said sleeve comprising a first cylindrical portion having a first outside diameter and a second cylindrical portion of a second outside diameter greater than said first outside diameter and a tapered transition between said first and said second cylindrical portions; said sealing ring further having a metal insert adjacent said second end and having a second bore extending from said second end and communicating with said first bore; said second bore having a diameter less than that of said first bore; a tapered annular shoulder from said first bore to said second bore; the internal end of said metal insert being within said tapered annular shoulder to prevent contact with such insert by objects passed along said bore into said second bore of said sealing ring.

16. In a connector for jacketed metal-clad cables having a body member and a gland nut; apparatus to ground the metal cladding of the cable and grip the jacket thereof comprising: a sealing ring having a bore therethrough, said sealing ring being disposed in said gland nut to advance therewith with respect to said body member as said gland nut is tightened upon said body member; said sealng ring having a rigid insert seated at the end thereof facing said body member; a grounding ring having a generally circular configuration and having a base defining an aperture to receive a metal-clad cable therethrough; at least two upstanding arms coupled to said base, diametrically opposed and extending perpendicularly to the plane of said base along the extent of a portion of a metal-clad cable passing through said aperture in said base; and outwardly inclined arms, one coupled to the free end of each of said upstanding arms and engageable by said insert to force said upstanding arms into intimate engagement with the metal-cladding of a metal-clad cable passing therebetween as said sealing ring is advanced with respect to said body member.

17. Apparatus as defined in claim 16, wherein said grounding ring further comprises support means coupled to said outwardly inclined arms and extending to said upstanding arms to prevent the deflection of said inclined arms with respect to said upstanding arms.

18. Apparatus as defined in claim 16, further comprising stop means coupled to said base and extending in the direction of said upstanding arms to limit the advancement of said sealing ring upon said outwardly inclined arms as said gland nut is tightened upon said body member and place said sealing ring in compression between said gland nut and said stop means to deform said sealing ring into gripping relation with the jacket of said jacketed metal-clad cable passing through said bore.

19. Apparatus as defined in claim 16, wherein said sealing ring has an annular undercut in the wall of said ring defining said bore adjacent said first end; said ring deforming inwardly towards said bore upon the application of compression forces to said first and said second ends of said ring.

20. Apparatus as defined in claim 16, wherein said sealing ring comprises a first cylindrical portion having a first outside diameter; said sealing ring having a second cylindrical portion of a second outside diameter greater than said first outside diameter and a tapered transition between said first and said second cylindrical portions; said second cylindrical portion being caused to compress about an object passed through said sealing ring as said second cylindrical portion is forced into the bore of said body member having an inside diameter larger than said first outside diameter of said sealing ring but less than the second outside diameter of said sealing ring.

21. In a connector for jacketed metal-clad cables having a body member and a gland nut, apparatus to ground the metal cladding of the cable and grip the jacket thereof comprising: sealing means having a first end part, a deformable central part and a second end part and a bore therethrough, said sealing means first end part in contact with said gland nut to advance said sealing means with respect to said body member as said gland nut is tightened upon said body member; a grounding ring having a base defining an aperture to receive a metal-clad cable therethrough, at least two upstanding arms coupled to said base, diametrically opposed and extending perpendicularly to the plane of said base along the extent of a portion of a metal-clad cable passing through said aperture in said base, and outwardly inclined arms, one coupled to the free end of each of said upstanding arms and engageable by said sealing means second end part, whereby said upstanding arms are forced into engagement with the metal-cladding of such cable passing therethrough, and said sealing means deformable central part is deformed by such end parts thereof into engagement with the jacketing of such cable, as said sealing means is advanced with respect to said body member.

22. A grounding ring for metal-clad cables comprising: a base having a generally circular configuration and defining an aperture to receive a metal-clad cable therethrough; at least two upstanding arms bendably coupled to said base, diametrically opposed and extending perpendicularly to the plane of said base along the extent of a portion of a metal-clad cable passing through said aperture in said base; and outwardly inclined arms, each individually coupled to the free end of one of said upstanding arms in manner preventing deflection thereof relative to such arm and adapted to be engaged by a member advanced towards said base to force said upstanding arms to bend from said base into engagement with the metal cladding of a metal-clad cable passing therebetween.

* * * * *